March 15, 1960

C. E. CATRON 2,928,991

PROTECTIVE DEVICE FOR THE WATER COOLED
JAWS OF A POSITIVE CARBON COOLER

Filed Feb. 27, 1958

INVENTOR.
CLAUDE E. CATRON
BY
*Price and Heneveld*
ATTORNEYS

March 15, 1960 C. E. CATRON 2,928,991
PROTECTIVE DEVICE FOR THE WATER COOLED
JAWS OF A POSITIVE CARBON COOLER
Filed Feb. 27, 1958 2 Sheets-Sheet 2

INVENTOR.
CLAUDE E. CATRON
BY
*Price and Heneveld*
ATTORNEYS

United States Patent Office 2,928,991
Patented Mar. 15, 1960

2,928,991

PROTECTIVE DEVICE FOR THE WATER COOLED JAWS OF A POSITIVE CARBON COOLER

Claude E. Catron, Grand Haven, Mich.

Application February 27, 1958, Serial No. 717,918

3 Claims. (Cl. 315—118)

This invention relates to a protective system and device for the water cooled jaws of a positive carbon cooler. More particularly this invention relates to a safety switch means mounted in the outlet water line of the water cooled jaws protecting the positive carbon of a high intensity arc lamp of the type used in motion picture projectors, the safety switch being responsive to the volume of water flowing through this outlet water line.

Positive carbon coolers are old in the art of high intensity arc lamps. These coolers cut carbon costs and generally produce much better results from such lamps. Positive carbon coolers are used extensively in the field of motion picture projection where the nearest thing to perfection in operation of the lamps is a necessity. However, the water cooled jaws of these carbon coolers may be damaged quite quickly if the projector is allowed to run while the supply of water to the jaws is interrupted or even slowed down. These water cooled jaws are quite expensive to replace and the projector must be shut down while the replacement is made. Sometimes the supply of water to these jaws is slowed down or stopped because of a mishap of one kind or another. Often the operator of a projector forgets to turn the water on when he starts the projector. A few minutes of operation of the projector's lamp without a supply of water passing through the jaws will cause irreparable damage to the jaws. Since replacement costs are high and the movie must be shut down during the time of replacement, it is desirable to obtain a means whereby the lamp cannot operate unless a predetermined volume of water is constantly passing through the jaws of the carbon cooler.

It is therefore an object of this invention to provide a protective device for the water cooled jaws of a positive carbon cooler for a high intensity arc lamp, assuring a constant flow of water through the jaws when the lamp is in operation.

Another object of this invention is to provide such a protective device which is inexpensive and simple to install in present positive carbon cooling systems.

Another object of this invention is to provide such a protective device which is controlled by the volume of water leaving the water cooled jaws.

A still further object of this invention is to provide such a protective device which is simple in construction and extremely dependable in function.

Other objects of this invention will become obvious to those skilled in the art of positive carbon coolers for high intensity arc lamps upon reading the specification in conjunction with the accompanying drawings, in which.

Briefly, this invention relates to a protective system and device for the water cooled jaws of a positive carbon cooler. A safety switch is mounted on the outlet passageway for water exiting from the water cooled jaws after passing therethrough, the switch being responsive to the volume of water passing through the outlet passageway. More specifically, the switch is a safety switch for insertion into a water line which includes a container interposed in the path of water flowing through the water line and a switch contact means. The container and the switch contact means are operably connected so that the switch contact means is actuated when a predetermined amount of water passes through the container.

Figure 1:
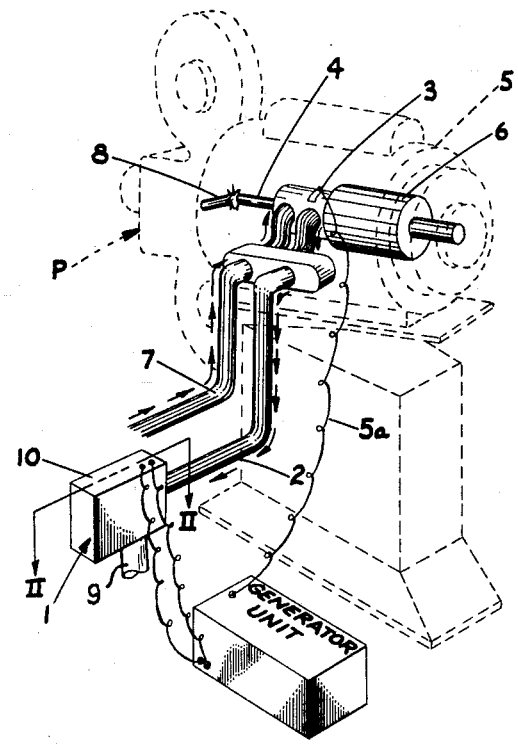
Fig. 1 is a side elevational, isometric view of an overall projector combination having a high intensity arc lamp with a positive carbon cooler. Certain parts are in phantom to better show the inventive features of the combination.
Figure 2:
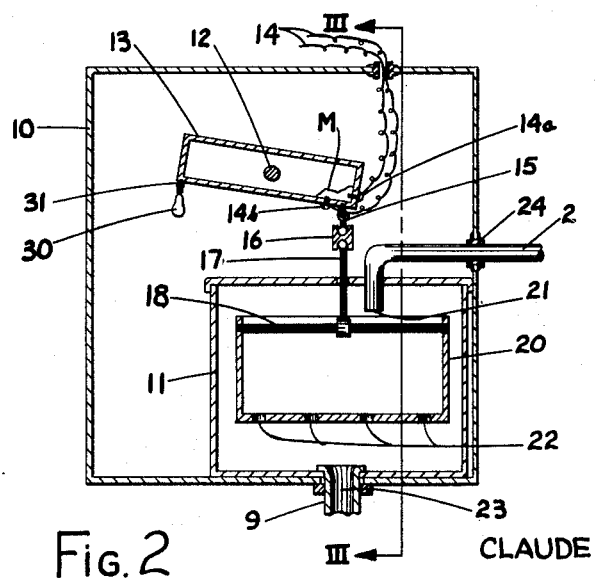
Fig. 2 is a cross sectional view of the protective device taken along the plane II—II of Fig. 1.

Referring to the drawings, Fig. 1 shows the protective switch assembly 1 mounted in the outlet water line 2 running from the water cooled jaw or so-called positive carbon cooler 3 of a conventional type including jaws (not shown) which hold the positive carbon in the proper position. Located rearwardly of the carbon cooler is a motor 6 provided for moving the carbon forwardly as it is burned so that the positive electrode carbon 4 is always spaced the proper distance from negative carbon-electrode 8. The carbon cooler 3 holds carbon electrode 4 of a high intensity arc lamp and is housed in projector housing 5, the lamp being utilized in a projector P. The jaws of the carbon cooler 3 are cooled by water entering the cooler from inlet water line 7, flowing around the jaws and exiting by way of outlet water line 2. The arrows in Fig. 1 follow the path of the water. The positive carbon electrode is subjected to a high voltage potential generated by the D.C. generator unit G including an A.C. motor (not shown) for driving the generator.

Because the general structure of high intensity arc lamps is old and well-known, it is deemed unnecessary to describe the lamp in housing 5 of Fig. 1 in detail. The carbon cooler 3 is of conventional form, such as are manufactured by the Hal I. Huff Manufacturing Company of Los Angeles, California. The generator unit is also well-known.

One aspect of this invention resides in the combination for controlling the operation of the generator in response to the cooling of the jaws of the positive carbon cooler. I have discovered a system of positively controlling the generator by providing responsive to the flow of water, in the outlet conduit from the cooler. Preferably, this switch is of the gravity type requiring a certain volume of water to flow into a container which actuates the switch. The switch controls the A.C. motor which drives the generator positively, stopping it and the generator when flow of water through the cooler stops.

The preferred switch 1 includes a housing 10, containing a container 11 through which the water exiting from the cooler 3 must pass. A fulcrum rod 12 is mounted on a wall of housing 10 and a mercury switch 13 is pivotally mounted on fulcrum rod 12. Mercury switch 13 is connected to the control circuit (Fig. 4) of the generator unit G (Fig. 3) by conductors 14 each of which are connected to one of the spaced contacts 14a and 14b. The globule of mercury M in the switch 13 is free to move to either end of the switch, depending upon the position of the switch. As shown, the mercury M bridges the two contacts 14a and 14b, permitting current to flow therebetween through conductors 14.

Suspended from one end of switch 13 by rod 15, rod 16, universal joint 17 and cross bar 18 is the receptacle 20, This receptacle 20 is positioned under the open end 21 of outlet water conduit 2, the outlet water line 2 entering housing 10 through the opening 24. Receptacle 20 has small sieve openings 22 in the bottom thereof. It will be noted that as water flows from opening 21 it flows into receptacle 20. The sieve openings 22 are sufficiently small in size and number to permit the normal required flow of water from cooler 3 and conduit 2 to fill and overflow the receptacle 20. The sieve openings 22 accommodate a supply of water less than that required by the cooler 3. As a result, overflow of receptacle 20 occurs only when sufficient quantities of water are flowing in conduit 2. Overflow water flows through openings 23 and discharge conduit 9 in the bottom of the container 11.

Suspended from the other side of switch contact means 13 by means of hook 31 is the weight 30. The weight 30 is of a size such that the moment created by it about the fulcrum rod 12 is greater than the moment created by the receptacle 20 when it is not completely overflowing with water. Thus, when an insufficient supply of water is flowing through conduit 2, weight 30 will pivot the switch contact means such that the mercury 32 lies away from the contact points 14a and 14b and the circuit is broken. However, whenever a flow of water causes the receptacle 20 to overflow with water, the weight will be pivoted by the water filled receptacle 20 about the fulcrum rod 12 such that the mercury will bridge the contact points 14a and 14b and complete the circuit. It will now be noted that the opening and closing of the switch 13 is dependent entirely on the volume of water flowing through the water outlet line 2. The volume of water necessary to make the circuit can be predetermined by the size of weight 30. Thus, whenever the correct volume of water exits from water outlet line 2, overbalancing the weight 30, the switch is closed. However, the instant the volume of water is cut off or even slows down, the weight will overbalance the receptacle 20 and the water therein, causing the switch to be immediately opened. The jaws of cooler 3 are always assured of a certain volume of water passing around them, because if this volume decreases below the requirement, the switch will open, opening the generator control.

Figure 3:
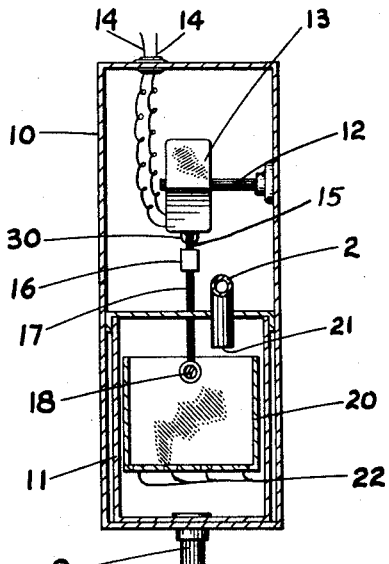
Fig. 3 is a cross sectional, elevational view taken along the plane III—III of Fig. 2.

Fig. 3 shows the generator control circuit including the protective switch assembly. The circuit includes a three-phase power supply represented by lines $L_1$, $L_2$, and $L_3$ electrically connected to the generator unit through the relay switch unit R. The operation of relay switch unit R is controlled by switch panel 60. The generator unit includes a three phase A.C. motor driving a D.C. generator the power of which is conducted through conductor 5a to positive electrode 4 of the arc lamp.

The relay unit R includes four movable switch arms 41, 42, 43, and 44 actuated by the relay coil 40. Arms 42, 43, and 44 have terminals 42a, 43a and 44a connected to conductors 45, 46 and 47, respectively, leading to the A.C. motor. Contacts 42b, 43b and 44b, connected to lines $L_1$, $L_2$ and $L_3$ are positioned for contact by arms 42, 43, and 44 for completing the connection of the motor to the three-phase power supply.

Relay coil 40 is connected to line $L_2$ by conductor 48 and contact 43b. Coil 40 is also connected to line $L_1$ through the switch panel 60 by two circuit paths, one a starting circuit and the other a holding circuit. The starting circuit includes conductor 49, contact 41b, conductor 50, start switch contacts 51 and 52 bridged by element 53, stop switch contacts 54 and 55 bridged by element 56, conductor 57 and contact 42b. The holding circuit includes conductor 49, contact 41b, conductor 58, protective switch assembly 1 (which includes switch 13), conductor 59, switch contact 52, stop switch contacts 54 and 55 bridged by element 56, conductor 57 and contact 42b.

The circuit permits the motor to be momentarily connected to the power supply by depressing the start button which energizes coil 40, closing switch arms 41, 42, 43 and 44 on contacts 41b, 42b, 43b and 44b. The relay switch arms are held closed, if switch assembly 1 is closed, by continued energizing of coil 40 through the switch assembly 1 which by-passes the start switch.

*Assembly*

This protective switch assembly can be incorporated during the assembly of conventional carbon cooling systems or on carbon cooling systems already in operation by simply connecting it in the holding circuit conventionally provided.

The assembly of the unit itself is as follows. The container 11, fabricated of any water tight material, is mounted within the housing 10 and discharge conduit 9 secured in opening 23. The discharge conduit 2 is inserted in opening 24 of the housing 10 above the container, as shown. The fulcrum rod 12 is mounted on a side of the housing, above the container 11. On this rod the mercury switch 13, having receptacle 20 on one end, is pivotally mounted. Wires 14 are attached to the contact points of the mercury switch and extend from the housing, to be connected into the generator control circuit.

The sieved receptacle 20, suspended from one end of the pivotally mounted mercury switch 13 by rods 15 and 16, joined together by universal joint 17, rod 16 being connected to cross bar 18, is properly positioned in the container 11 below opening 24. A suitable weight 30 is then attached to the hook 31 at the other end of switch 13.

Figure 4:
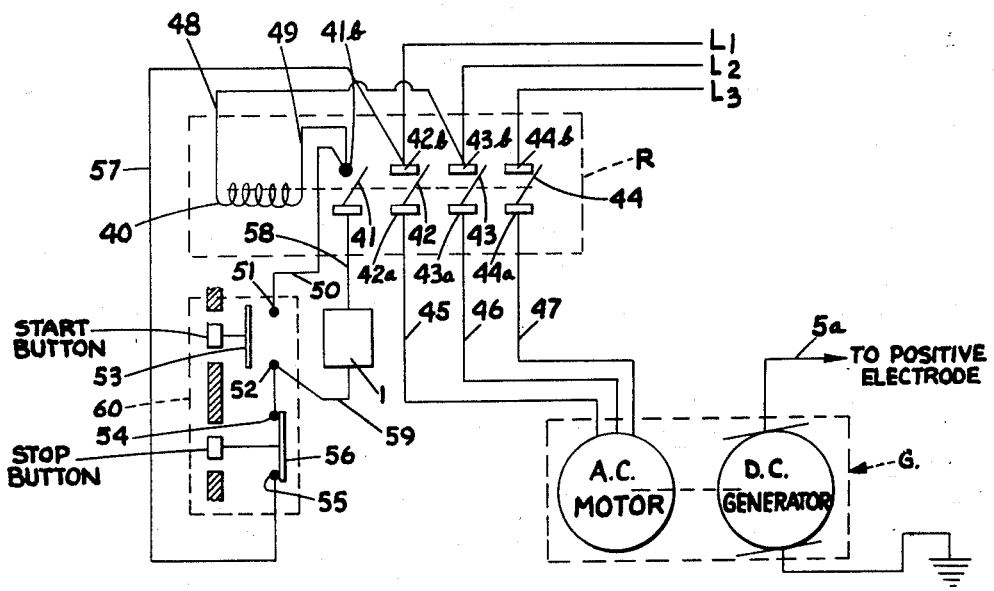
Fig. 4 is a wiring diagram of the generator control circuit for the system of this invention.

To install this unit into an existing carbon cooling system, one need first of all to suitably separate the water pipe acting as the outlet water line of the system. One end of the separated pipe is inserted through opening 24 in the housing 10, extending over the receptacle 20, and the other end is attached to the opening 23 in the bottom of container 11 and housing 10. The wires 14 are then mounted into the holding circuit of the generator control system as shown in Fig. 4. The device is then completely installed and ready to serve its function.

*Operation*

The operation of this protective device is obvious from the above description. The generator is started by pressing the start button causing element 53 to bridge contacts 51 and 52. This connects coil 40 across lines $L_1$ and $L_2$ by means of conductors 49 and 50, control panel 60 and conductor 57. When the start button is released and if a sufficient volume of water is flowing into receptacle 20 of switch assembly 1, the connection across lines $L_1$ and $L_2$ is continued by means of the holding circuit including conductors 48 and 49, switch arm 41, conductor 58, switch assembly 1, conductor 59, control panel 60, and conductor 57. If the required volume of water flows for a time and decreases due to any number of reasons the coil connection across lines $L_1$ and $L_2$ will be broken by switch assembly 1. This is accomplished by the mercury switch 13 changing its position as the required volume of water fails to flow into receptacle 20.

Thus the carbon cooling system is equipped with a protective device which assures that the jaws will always have a sufficient amount of water flowing around them to cool and thereby prevent irreparable damage to the jaws. The device is inexpensive and easy to install into a carbon cooling system already in operation. The device is controlled positively by the volume of water passing around the jaws, the one factor determining both the efficiency of the positive carbon and the safety of the jaws. This makes the device extremely dependable in its function of protecting the jaws from damage, and its simplicity of construction assures a minimum of possible breakdowns.

While I have described a preferred embodiment of this invention, it can be practiced through use of other em-

I claim:

1. In combination with a high intensity arc lamp having: a positive carbon electrode and a negative electrode; an electrical power generator means electrically connected to said electrodes; means to control said generator means; water cooled jaws holding said positive carbon cooler; an inlet and an outlet passageway for water to enter into and exit from said water cooled jaws; and a safety switch mounted in said outlet passageway and operatively connected to said generator control means; said safety switch being responsive to the volume of water passing through said outlet passageway for cutting off said generator when less than a predetermined volume of water passes through said outlet passageway.

2. In combination with a high intensity arc lamp: a positive carbon electrode and a negative electrode; an electrical generator means electrically connected to said electrodes; means to control said generator means; water cooled jaws holding said positive carbon cooler; an inlet and an outlet passageway for water to enter into and exit from said water cooled jaws; and a safety switch mounted in said outlet passageway and operably connected to said generator control means; said safety switch including a container interposed in the path of the water existing from said water cooled jaws by way of said outlet passageway; and a switch contact means mounted about a fulcrum; said contact means in one position allowing said generator to operate and in a second position cutting off said generator, said container operably connected to said contact means such that said contact means is in said second position when less than a predetermined volume of water passes through said container.

3. In combination with a high intensity arc lamp: a positive carbon electrode and a negative electrode; an electrical generator means electrically connected to said electrodes; means to control said generator means; water cooled jaws holding said positive carbon cooler; an inlet and an outlet passageway for water to enter into and exit from said water cooled jaws; and a safety switch mounted in said outlet passageway and operably connected to said generator control means; said safety switch including a container interposed in the path of the water exiting from said water cooled jaws by way of said outlet passageway; and a mercury switch contact means mounted about a fulcrum, said contact means in one position allowing said generator to operate and in a second position cutting off said generator; said container connected to said contact means at one side of said fulcrum; and a weight connected to said contact means at the other side of said fulcrum, said weight causing said contact means to be in said second position when less than a predetermined amount of water passes through said container.

References Cited in the file of this patent

UNITED STATES PATENTS

| | | |
|---|---|---|
| 1,847,086 | Gargan | Mar. 1, 1932 |
| 2,051,395 | Robinson et al. | Aug. 18, 1936 |
| 2,454,957 | Zimmerman | Nov. 30, 1948 |
| 2,475,473 | Brown | July 5, 1949 |
| 2,478,533 | Huff | Aug. 9, 1949 |
| 2,495,970 | Huff | Jan. 31, 1950 |
| 2,593,260 | Brown | Apr. 15, 1952 |
| 2,651,736 | Ashcraft | Sept. 8, 1953 |
| 2,788,459 | Gretner | Apr. 9, 1957 |